US008170005B2

(12) United States Patent
Mukaiyama et al.

(10) Patent No.: US 8,170,005 B2
(45) Date of Patent: May 1, 2012

(54) METHODS AND SYSTEMS FOR ASSIGNING CALL SESSION CONTROL SERVER

(75) Inventors: Shigeki Mukaiyama, Tokyo (JP); Keigo Murakami, Tokyo (JP)

(73) Assignee: NEC Corporation, Tokyo (JP)

( * ) Notice: Subject to any disclaimer, the term of this patent is extended or adjusted under 35 U.S.C. 154(b) by 1079 days.

(21) Appl. No.: 12/050,317

(22) Filed: Mar. 18, 2008

(65) Prior Publication Data

US 2008/0305794 A1    Dec. 11, 2008

(30) Foreign Application Priority Data

Mar. 19, 2007    (JP) ................................ 2007-070893

(51) Int. Cl.
*H04L 12/66*    (2006.01)
(52) U.S. Cl. ........ 370/352; 709/223; 709/225; 709/226; 455/432.1; 455/433; 455/435.1; 455/422.1; 370/328
(58) Field of Classification Search .................. 370/352, 370/328; 709/225, 223, 226; 455/453, 432.1, 455/433, 435.1, 422.1
See application file for complete search history.

(56) References Cited

U.S. PATENT DOCUMENTS

| 8,041,349 | B2* | 10/2011 | Fukui et al. | ................ | 455/422.1 |
| 2004/0017798 | A1* | 1/2004 | Hurtta et al. | .................. | 370/352 |
| 2005/0141481 | A1* | 6/2005 | Kauppinen | .................... | 370/352 |
| 2005/0213589 | A1 | 9/2005 | Shih | | |
| 2006/0077965 | A1* | 4/2006 | Garcia-Martin et al. | ..... | 370/352 |
| 2007/0283022 | A1* | 12/2007 | Rajko et al. | .................... | 709/227 |
| 2007/0287454 | A1* | 12/2007 | Zhu et al. | .................. | 455/435.1 |
| 2008/0162637 | A1* | 7/2008 | Adamczyk et al. | ........... | 709/204 |
| 2008/0198839 | A1* | 8/2008 | Ku et al. | ....................... | 370/352 |
| 2008/0212569 | A1* | 9/2008 | Terrill et al. | .................. | 370/352 |
| 2008/0219241 | A1* | 9/2008 | Leinonen et al. | ............. | 370/352 |
| 2008/0227451 | A1* | 9/2008 | Fukui et al. | ................ | 455/435.1 |

FOREIGN PATENT DOCUMENTS

JP    2006115453 A    4/2006

(Continued)

OTHER PUBLICATIONS

European Search Report for EP Application No. 08102746.8 completed Jun. 23, 2008.

(Continued)

*Primary Examiner* — Kamran Afshar
*Assistant Examiner* — Allahyar Kasraian

(57) ABSTRACT

The present invention provides a call session control server assignment method and system for equalizing loads of a plurality of call session control servers (S-CSCF servers). For this end, the HSS server 40 is provided with an S-CSCF selection table 41A that stores priority information indicating the order of priority at the time of assigning user equipment in response to the current operation condition of the plurality of S-CSCF servers 20, 21, 22 and the like in correspondence with the respective S-CSCF servers. When an interrogating call session control server (I-CSCF server) 30 sends an interrogation to the HSS server 40 for determining a particular S-CSCF server for registering the user equipment and administering a call session control for the user equipment at the registration time of the user equipment, a reference is made to the S-CSCF selection table 41A for selecting a particular S-CSCF server to be assigned in response to the current operation condition of the respective S-CSCF servers 20, 21, 22 and the like and also the information in the S-CSCF selection table 41A is sent back to the I-CSCF server 30.

8 Claims, 11 Drawing Sheets

FOREIGN PATENT DOCUMENTS

| WO | 03075596 A1 | 9/2003 |
|---|---|---|
| WO | 2007009498 A | 1/2007 |

OTHER PUBLICATIONS

Biplab Chattopadhyay et al., "S-CSCF Load Balancing", (Motorola) IP.COM Journal, IP.COM Inc., West Henrietta, NY, US, May 17, 2006, XP013114123 ISSN: 1533-0001.

Sang-Chul Oh et al., "The Serving CSCF Assignment Algorithm in Wireless IP Mutlimedia Networks", Midwest Symposium on Circuits and Systems, Cairo, Egypt, Dec. 27-30, 2003; (Midwest Symposium on Circuits and Systems), Piscataway, NJ, IEEE, US, vol. 1, Dec. 27, 2003 pp. 440-445, XP010867485, ISBN: 978-0-7803-8294-7.

Japanese Office Action for JP2007-070893 issued May 24, 2011.

\* cited by examiner

METHODS AND SYSTEMS FOR ASSIGNING CALL SESSION CONTROL SERVER

INCORPORATION BY REFERENCE

This application is based upon and claims the benefit of priority from Japanese patent application no. 2007-070893, filed on Mar. 19, 2007, the disclosure of which is incorporated herein in its entirety by reference.

FIELD OF THE INVENTION

The present invention relates to a call session control server assignment method and a call session control server assignment system, more particularly to assignment method and system for assigning S-CSCF servers (Serving Call Server Control Function servers) that perform call session control based upon an SIP (Session Initiation Protocol) in an NGN/IMS (Next generation Network/IP Multimedia Subsystem) network.

BACKGROUND OF THE INVENTION

Currently, as a next generation communication network NGN (Next Generation Network), intensive studies have been made on a core technology known as an IMS (IP Multimedia Subsystem) for flexibly providing multimedia applications including not only stationary communications and mobile communications but also audios, videos and the like by a packet communication network based upon the IP (Internet Protocol) communication protocol. See, for example, "IMS, a core of NGN" internet URL (http://web.forum.impressrd.jp/feature/) and Japanese patent publication (JP2006-115453A) for more information.

The IMS architecture comprises basic constituting elements as shown in FIG. 7. That is, FIG. 7 is a conceptual illustration of basic constituent elements of the IMS network. It comprises various multimedia terminals, i.e., user equipment UE (User Equipment) 201, 202 including mobile phones, stationary telephones, PDAs, notebook PCs, desktop PCs and the like as IMS clients, an IP network 500 including a plurality of IP networks such as a home network 100, another network (within the zone) 101 and the like, and application server group 300 such as application servers AS301, AS302, etc.

The IP network 500 interconnects the IMS clients, i.e., the user equipment UE 201, 202 using broadband networks such as ADSL, FTTH, etc. or wireless interfaces. Also, the IP network 500 interconnects the user equipment UE 201, 202 using the IP protocol for all communications, thereby enabling to commonly use the application servers AS301, AS302 for realizing various services. It is to be noted that the IP network 500 uses an SIP (Session Initiation Protocol) to control making or breaking of communication paths to be used for services. For this end, a plurality of SIP servers 100A, 100B, 101A and the like are installed in the IP network 500 so that they cooperate with one another.

In other words, the IMS communication provides a common system for providing various services (multimedia services) on the IP protocol based packet communication network. Using the IP protocol and interconnecting the user equipment UE 201, 202 that are provided with interfaces for IMS, the IP network 500 enables to perform communications using various media and make a connection to the application server AS301 for providing application services using audios and videos that the user chooses from the application server group 300 that provides various multimedia services.

Moreover, the IP network 500 allows the user equipment UE 201 to gain access to the home network 100 from another network 101 in his/her office for receiving the same services as from the home network 100 even if the user equipment UE 201 may move between networks. When moved to any other network, roaming is performed with the home network 100, thereby enabling to receive the same services as he/she is located in the home network 100. For this end, by the use of the system of performing the "home network control" that cooperates with the SIP server 101A in another network 101 at the location where he/she moves and the SIP servers 100A, 100B in the home network 100, the user is able to use always the same services whichever network he/she may move without depending upon the network at the location where he/she is.

Now, functions of the SIP servers 100A, 100B, 101A and the like as shown in FIG. 7 will be described in greater detail with reference to FIG. 8. FIG. 8 is a conceptual diagram to show functions of the SIP servers that are key constituent elements of the IP network 500 in the IMS architecture. The SIP servers comprise at least one of three kinds of functions. One is a P-CSCF (Proxy Call Server Control Function: proxy control function) for enabling the user equipment UE to gain access either directly or by way of an access network. One of the other functions is an I-CSCF (Interrogating CSCF: interrogating control function) for accepting any interrogation from other CSCF or having a gateware function with other networks. The last one is an S-CSCF (Servicing CSCF: call session control function) for performing a session control based upon the SIP in the home network. In other words, the P-CSCF function constitutes a user equipment accommodation session control server, the I-CSCF function constitutes an interrogating session control server and the S-CSCF function constitutes a call session control server for performing a core call session control in the IMS network.

Each of the P-CSCF, I-CSCF and S-CSCF functions may be configured as a physically separated server (i.e., a P-CSCF server, an I-CSCF server or an S-CSCF server) or alternatively one or more functions may be physically merged with another as an integrated server. Moreover, it is also possible to configure a single server having a plurality of divided sections for the same function so as to split the loads.

Each of the SIP servers 100A, 100B and 101A as exemplified in FIG. 7 is provided with either one or more of these functions. In the particular example as shown in FIG. 8, the SIP server 100A in the home network 100 is provided with a P-CSCF function 10A for connecting the user equipment UE 202 and a single S-CSCF function 20A. The SIP server 100B is provided with a pair of S-CSCF functions 20B, 21B and an I-CSCF function 30B for making connection with another network 101 in which the user equipment UE 201 is moved. On the other hand, the SIP server 101A in another network 101 is provided with a P-CSCF function 11A for connecting the user equipment UE 201 and an I-CSCF function 31A for making connection with the home network 100. As described hereinbefore, each SIP server is provided with a plurality of CSCF functions and it is also possible to provide independent servers depending upon traffic amounts just like in this particular example.

Moreover, as shown in FIG. 8, disposed in the IP network are an HSS server (Home Subscriber Server) 40 and, if necessary, an SLF function (Subscriber Locator Function) 50 as a database server. The HSS server 40 is a database server for registering and saving such information as user information, profiles on services that each user subscribes, user authentication information, user movement management information (current location information) and the like, thereby registering all information that are required when each CSCF function performs session control. On the other hand, the SLF function 50 is a database for registering the information to show the relationship between the HSS server 40 in which user information are registered and the users. If there are plural HSS servers within the network, the SLF function 50 has a function to receive interrogations from the I-CSCF function and conduct a search for a particular HSS server in which the user information for the interrogated user is registered.

Now, detailed descriptions will be given hereunder on each function of the P-CSCF function, the I-CSCF function and the S-CSCF function.

The P-CSCF function (Proxy Session Control function or User Equipment Accommodation Session Control Function) connects an IMS client or the user equipment UE by way of a broadband subscriber network such as ADSL, FTTH or the like or any other access network such as a wireless network, a PSTN network or the like for receiving SIP messages from the user equipment UE or transmitting or sending SIP messages to the user equipment UE. In case of connecting by way of the access network, a connection is made from the existing W-CDMA network for accommodating, for example, a mobile phone user equipment UE by way of a packet switching known as a GGSN (Gateway GPRS Support Node) that has a function of connecting to an external network. On the other hand, any call from the broadband access network such as fixed ADSL, FTTH or the like or from the wireless LAN is connected by way of a relay router in the IP network of the access system.

The P-CSCF function is allocated at the registration (location registration) time of the user that is performed prior to start of IMS communication. After completing authentication between the user equipment UE and the IMS communication IP network, an IPsec tunnel is set between the user equipment UE for maintaining communication secrecy. All SIP messages that are transmitted or received between the user equipment UE are transferred safely over the IPsec tunnel and rationality check of the received SIP messages is also made in the P-CSCF function. Not only the P-CSCF function within the home network but also roaming is performed using the P-CSCF function in another network at the location where the user is moved in, thereby enabling to effectively transfer the traffic from the user equipment UE to the network at the moved location. However, it is to be noted that tunneling is made on all traffics such as VoIP or the like from the user equipment by the P-CSCF function in the home network if no IMS function is included in the network at the moved location.

The I-CSCF function (Interrogating Session Control Function) is disposed in the home network. At the registration time of the user equipment UE to the IMS communication IP network that is performed prior to start of communication, it identifies the HSS server in which the user information (i.e., subscriber information) of the user equipment UE is registered by making a reference with the SIP messages received by the P-CSCF function or by gaining access, if necessary, to the SLF function (i.e., Subscriber Locator Function) if there are plural HSS servers (i.e., Home Subscriber Servers) in which the user information (subscriber information) is registered. Then, a decision is made of the S-CSCF function that performs the call session control of the user equipment UE in response to the information from the HSS server. The SIP messages of the user equipment UE that are received from the determined P-CSCF function are routed for succeeding the registration procedures for the user equipment UE.

Furthermore, the I-CSCF function determines the S-CSCF function that performs the call session control for the user equipment UE by gaining access to the HSS server in which the user information (subscriber information) for the user equipment UE is registered even if accessed through any other network, thereby succeeding communication from the other network. This means that the I-CSCF function enables to smoothly split loads in case of existence of plural HSS servers and simultaneously plays a role of shielding the structures within the network from outside networks.

The S-CSCF function (Call Session Control Function) is a SIP server that is a core of the session control by the SIP protocol as a SIP registration server that performs the call session control of the user equipment UE utilizing the registered IMS services and holds the user information (subscriber information) and the current location information of the user equipment UE that are downloaded from the HSS server. It also performs the session control of the communications between user equipment UE and activates the service procedures of the application server AS in response to the request of the user equipment UE in accordance with the user information (subscriber information) setting that is registered in the HSS server. Moreover, when the user equipment UE appoints with whom to communicate by its telephone number based upon the E.164 Recommendation, it has a function to make the routing based upon such telephone number.

The S-CSCF function makes a connection to a common enabler (general purpose functions to be used to realize application services such as presences, messages or the like) to be commonly used for various different application services and the application servers AS for performing controls for individual application services by way of a standard interface known as the SIP based ISC (IMS Service Control).

On the other hand, the application server group 300 including a plurality of AS (Application Servers) 301, 302, . . . as shown in FIG. 7 are a group of servers for processing various application services. They are activated by the S-CSCF function in response to the processing request from each user equipment UE. It is to be noted that applications for services similar to the conventional telephone network are also provided.

Now, basic transmission (i.e., sending) and receiving procedures in case when the IMS user performs IMS communications will be described hereunder with reference to FIGS. 9 and 10. FIG. 9 is a flowchart to show the flow of transmission (or calling) procedures when the user equipment UE performs IMS communications. On the other hand, FIG. 10 is a flowchart to show receiving procedures when the user equipment UE performs IMS communications. In the following descriptions, the servers for performing the P-CSCF function, the I-CSCF function and the P-CSCF function are referred to as the P-CSCF server, the I-CSCF server and S-CSCF server, respectively.

Firstly, the transmission or calling procedures will be described with reference to FIG. 9. The user equipment UE uses an "INVITE message" in order to start a session. The user equipment UE sets the URI (Uniform Resource Identifier) for the S-CSCF server that are stored at the registration time prior to starting IMS communications as the "Service -Route" header in the "INVITE message" for instructing the routing to the user equipment UE (sequence SQ21). The P-CSCF server that received the "INVITE message" from the user equipment UE makes a reference with the S-CSCF server that is memorized at the registration time. If agrees, the received "INVITE message" is transferred to the S-CSCF server without gaining access to the I-CSCF server (sequence SQ22).

The P-CSCF server that received the "INVITE message" from the I-CSCF server determines the routing for transmitting the "INVITE message" based upon the information with whom the communication is made as designated in the "INVITE message" (sequence SQ23). Subsequently, the S-CSCF server receives a tentative response "100 Trying" that indicates to have received the "INVITE message" from the subsequent CSCF at the receiving side (sequence SQ24). When receiving a tentative response "180 Ringing" that indicates ringing (sequence SQ26), it is transferred to the respective transmission (calling) side user equipment UE (sequence SQ25 and sequence SQ27).

The transmission side user equipment UE that received the tentative "180 Ringing" or the S-CSCF server that received a final response "200 OK" that indicates the session setting completion is received from the subsequent CSCF side (i.e., the receiving side user equipment UE in the particular example in FIG. 9) (sequence SQ28) transfers the received "200 OK" to the transmission side (i.e. precedent transmission side in FIG. 9) (sequence SQ29). When an acknowledgement response "ACK" to the "200 OK" is received from the transmission side (sequence SQ30), the S-CSCF completes the set-up procedures for opening the session and sends the acknowledgement response "ACK" to the transmitter of the "200 OK" (sequence SQ31), thereby establishing the transmission side communication session of the IMS communication in accordance with the SIP protocol.

The "INVITE message" in accordance with the SIP protocol adopts means for confirming reliable data transmission to the communication partner by three directional handshakes of "request (INVITE)", "final response (200 OK)", and "acknowledgement (ACK)". Moreover, a tentative responses of "1 xy" (100 Trying and 180 Ringing) is returned from the receiving side to the transmission side before returning the "200 OK", thereby notifying the progress of the session set-up.

It is to be noted that the "INVITE message" and the "200 OK" (success message of session set-up request) in the IMS communication use the protocol known as an "SDP (Session Description Protocol)" that describes the contents of the established multimedia session.

Now, the receiving procedures will be described hereunder with reference to FIG. 10. The "INVITE message" from the S-CSCF server at the transmission or calling side is received by the I-CSCF server (sequence SQ41). The I-CSCF server interrogates the HSS server about the S-CSCF server allocated thereto at the registration time of the user equipment UE at the receiving side using the Diameter protocol and routing of the received "INVITE message" is made to the URI for the S-CSCF server that is returned from the HSS server (sequence SQ42).

The S-CSCF server that received the "INVITE message" distinguishes the URI for the P-CSCF server that is recorded at the registration time based upon the information set in the Path header and routing of the "INVITE message" is made to the P-CSCF server (sequence SQ43). Then, the P-CSCF server transfers the "INVITE message" to the user equipment UE that is designated in the received "INVITE message" (sequence SQ44) and returns to the S-CSCF server at the receiving side by way of the S-CSCF server and the I-CSCF server the tentative response "100 Trying" to indicate that the "INVITE message" has been distributed to the user equipment UE (sequence SQ45).

The user equipment UE that received the "INVITE message" goes to the ringing state for calling the user and returns the tentative response "180 Ringing" to the P-CSCF server (sequence SQ46). The P-CSCF server that received the tentative response "180 Ringing" indicating to be called by the user equipment UE transfers the tentative response "180 Ringing" to the S-CSCF server at the receiving side by way of the S-CSCF server and the I-CSCF server (sequence SQ47).

Thereafter, when the user called from the user equipment UE responds, the user equipment UE transmits the final response "200 OK" to the P-CSCF server indicating that the request designated in the "INVITE message" has been accepted (sequence SQ48). The P-CSCF server that received the final response "200 OK" from the user equipment UE indicating that the request was accepted transfers the final response "200 OK" to the S-CSCF server at the transmission side by way of the S-CSCF server and the I-CSCF server (sequence SQ49). Since the final response "200 OK" is returned in a form of including the URI for the CSCF servers other than the I-CSCF server sequentially inserted into the "Record-Route" header at the time of receiving the "INVITE message", all subsequent messages will be directly transmitted without any intervention of the I-CSCF server.

Thereafter, acknowledgement responses "ACK" of the transmission side to the returned final response "200 OK" are directly transmitted to the S-CSCF server at the receiving side from the S-CSCF server at the transmission side without any intervention of the I-CSCF server (sequence SQ50). The S-CSCF server at the receiving side that received the acknowledgement response "ACK" from the S-CSCF server at the transmission side transmits the acknowledgement response "ACK" to the user equipment UE at the receiving side byway of the P-CSCF server (sequence SQ51). As a result, established is the receiving side communication session by the IMS communication in accordance with the SIP protocol.

Now, basic procedures for terminating the IMS communication will be described with reference to FIG. 11. FIG. 11 is a sequence chart to show the flow of processing that the user equipment terminates the IMS communication. The User equipment UE for terminating communication and releasing the session transmits a "BYE message" that means the end of session to the communicating user equipment UE through the route of the P-CSCF server and the S-CSCF server at the transmission side as well as the S-CSCF server and the P-CSCF server at the receiving side that are used in the IMS communication (sequence SQ61).

The receiving side user equipment UE that received the "BYE message" returns a final response "200 OK" indicating that the release of session is accepted to the "BYE message" transmitting user equipment UE in the opposite direction to the transmission route of the "BYE message" (sequence SQ62). As a result, the communication session is released. Different from the "INVITE message", the "BYE message" adopts a two-directional shake-hand system of the "request (BYE)" and the "200 OK".

If the user equipment UE uses an application service that the application server AP provides, such set-up is made at the registration time of the IMS communication and a "Filter Criteria" that is a reference of judgment of the application service is returned to the S-CSC server from the HSS server. Examples of the "Filter Criteria" include, for example, types of message, direction of session, kinds of registration (initial registration, re-registration and erase of registration), presence or absence and contents of the SIP header, SDP (Session Description Protocol) parameters (kinds of medium) and the like. Also included is designation information of the application server AS that is included in the routing of the SIP message.

It is to be noted that the use of the application server AS enables to provide telephone services similar to the line switching such as a call transferring service or the like other than music and video distribution services such as, for example, "karaoke" services and VoD (Video on Demand) services.

When SIP messages from the user equipment UE are received/ the S-CSCF server performs session control to transfer to the application server AS only SIP messages that satisfy the "Filter Criteria" by referring to the "Filter Criteria" that was received from the HSS server at the registration time of the IMS communication. In this way, SIP messages that are transferred to the application server AS are able to be transferred from the application server AS to the distribution addresses for providing the corresponding services.

As for identifiers for identifying the kind of services, used is a "public service ID (PSI)" similar to the "public user ID (IMPU)" for identifying each subscriber. By designating a desired PSI by the user equipment UE, the S-CSCF server directly routes the messages to the application server AS corresponding to the designated PSI, thereby enabling to provide the application services.

In the IMS architecture having the network construction as described hereinabove, it is required that the user equipment UE performs proceedings (i.e., registration request by REGISTER message) to determine the S-CSCF server for making a call session control for each user equipment UE among a plurality of S-CSCF servers (call session control servers) disposed in the home network of each user equipment UE prior to transmission and receiving operations of each user equipment UE using the SIP protocol.

At this time, in a prior art, the P-CSCF server that received the REGISTER message from the user equipment UE for requesting registration interrogates the I-CSCF server. Then, the I-CSCF server that received the interrogation causes the HSS server to transfer a list of all S-CSCF servers in the home network and determines the S-CSCF servers in charge of the user equipment UE that sends the registration request, i.e., the S-CSCF servers that administrate call session controls of the user equipment UE in a predetermined sequence or order.

However, since the registration status of the user equipment UE dynamically changes in each S-CSCF server due to not only the registration request of the user equipment UE but also erasing of such registration, the conventional method of allocating the S-CSCF servers in a predetermined sequence results in incapability of evenly distributing the number of user equipment UE that are registered in the S-CSCF servers, thereby unavoidably encountering a trouble of concentrated loads in a particular S-CSCF server.

SUMMARY OF THE INVENTION

In consideration of the above problem associated with the prior art, it is an object of the present invention to provide a call session control server assignment method and a call session control server assignment stem for controlling the loads of the S-CSCF servers substantially equal by properly assigning the S-CSCF servers (Call Session Control Servers) in which the user equipment UE are registered in consideration of the registration status and the load status in each S-CSCF server.

In order to solve the abovementioned problem, the call session control server assignment method and the call session control server assignment system according to the present invention employ the unique construction as follows:

(1) A call session control server assignment method for assigning a particular call session control server (S-CSCF server) that registers a user equipment and administrates call session control on the user equipment from a plurality of S-CSCF servers in an IP network for achieving IMS (IP Multimedia Subsystem 9 architecture, comprising the steps of:

providing a S-CSCF server selection table that stores in correspondence with each S-CSCF server priority information indicating the order of priority when assigning user equipment in accordance with the current operation condition of each S-CSCF server in a home subscriber server (HSS server) that stores user information for each user equipment;

referring to the S-CSCF server selection table by the HSS server when it receives an interrogation from an interrogating session control server (I-CSCF server) for determining a particular S-CSCF server that registers the user equipment at the time of registration thereof; and selecting the S-CSCF server to be assigned by the HSS server in response to the current operation condition of each S-CSCF server for sending the selected S-CSCF server back to the I-CSCF server from which the interrogation is sent.

(2) A call session control server assignment method of the above (1), wherein at the time of receiving the interrogation from the I-CSCF server, the HSS server sends back information including the priority information of the plurality of S-CSCF servers registered in the S-CSCF selection table instead of selecting the particular S-CSCF server to be assigned to the I-CSCF server from which the interrogation is sent, and the I-CSCF server determines the S-CSCF server to be assigned based upon the sent back priority information of each S-CSCF server.

(3) A call session control server assignment method of the above (2), wherein at the time of sending back the information including the priority information of the plurality of S-CSCF servers to the I-CSCF server from which the interrogation is sent, the HSS server rearranges the plurality of S-CSCF servers in the sequence corresponding to the priority information before sending back to the I-CSCF server from which the interrogation is sent.

(4) A call session control server assignment method of the above (2), wherein in case of using the Diameter protocol in information exchange between the HSS server and the I-CSCF server, the HSS server uses a Capability information column that is included in the UAA (User Authorization Answer) of the Diameter protocol for sending back the information including the priority information for the plurality of S-CSCF servers to the I-CSCF server from which the interrogation is sent.

(5) A call session control server assignment method of the above (1), wherein the HSS server sends a request for returning information corresponding to the priority information to the plurality of call session control servers at every predetermined time interval, thereby periodically updating the priority information in the S-CSCF server selection table based upon the information sent back thereto from the plurality of S-CSCF servers.

(6) A call session control server assignment method of the above (1), wherein the HSS server receives the information corresponding to the priority information sent thereto from the plurality of S-CSCF servers at every predetermined interval for periodically updating the priority information in the S-CSCF server selection table based upon the information received from the plurality of S-CSCF servers.

(7) A call session control server assignment method of the above (1), wherein the priority information stored in the S-CSCF server selection table of the HSS server is the number of currently registered user equipment in the respective S-CSCF servers.

(8) A call session control server assignment method of the above (1), wherein the priority information stored in the S-CSCF server selection table of the HSS server is the current amount of calls per unit time and/or the number of simultaneous connections and/or the number of transmitted or received messages of the respective S-CSCF servers.

(9) A call session control server assignment method of the above (1), wherein the priority information stored in the S-CSCF server selection table of the HSS server is the current operation rate of the processing processor per unit time and/or the rate of use of the memories and/or the size of the transmitted and received messages of the respective S-CSCF servers.

(10) A call session control server assignment system for assigning a particular call session control server (S-CSCF server) that registers user equipment and administrate call session control for the user equipment from a plurality of S-CSCF servers at the registration time of the user equipment in an IP network for achieving an IMS (IP Multimedia Subsystem) architecture, characterized in that:

a home subscriber server (HSS server) for storing user information for each user equipment is provided with a S-CSCF server selection table for storing priority information indicating the order of priority at the time of assigning the user equipment in response to the current operation condition of the respective S-CSCF servers in correspondence with the respective S-CSCF servers; and at the time of receiving an interrogation to the HSS server from an interrogating session control server (I-CSCF server) for determining a particular S-CSCF server to register the user equipment at the registration time of the user equipment, the HSS server refers to the S-CSCF server selection table and selects a particular S-CSCF server to be assigned in response to the current operation condition of the respective S-CSCF servers before sending it back to the I-CSCF server from which the interrogation is sent.

(11) A call session control server assignment system of the above (10), wherein at the time of receiving the interrogation from the I-CSCF server, the HSS server sends back information including the priority information of the plurality of S-CSCF servers registered in the S-CSCF server selection table instead of selecting the S-CSCF server to be assigned to the I-CSCF server from which the interrogation is sent, and the I-CSCF server determines the S-CSCF server to be assigned based upon the priority information of the respective S-CSCF servers sent back thereto.

(12) A call session control server assignment system of the above (11), wherein at the time of sending back the information including the priority information of the plurality of S-CSCF servers to the I-CSCF server from which the interrogation is sent, the HSS server rearranges the plurality of S-CSCF servers in the sequence of the priority information and sends back to the I-CSCF server from which the interrogation is sent.

The call session control server assignment method and the call session control server assignment system according to the present invention exhibit the following practical advantages:

Firstly, it is possible to determine the call session control servers (CSCF servers to be assigned to a new user equipment UE so that the number of user equipment UE to be registered by each call session control server (S-CSCF server) for administering call session control is equalized or loads of each S-CSCF server are equalized. As a result, the present invention provides precaution for avoiding any confusion due to concentrated loads to a certain S-CSCF server.

Secondly, the call session control server assignment method and the call session control server assignment system according to the present invention enable to determine the S-CSCF server to which a new user equipment UE is assigned so that the rate of use of the CPU or the memories of each S-CSCF server is equalized. As a result, the present invention provides precaution for avoiding any confusion in a certain S-CSCF server by equalizing the total loads including not only the call session but also maintenance session such as backup processing among S-CSCF servers.

BRIEF DESCRIPTION OF DRAWINGS

In the accompanying drawings.

DESCRIPTION OF EXEMPLARY EMBODIMENTS

Now, an exemplified embodiment of the call session control server assignment method and the call session control server assignment system according to the present invention will be described with reference to the accompanying drawings. Although P-CSCF function, I-CSCF function and S-CSCF function that are provided in the SIP server are described respectively as physically separated P-CSCF server, I-CSCF server and S-CSCF server in the following exemplary embodiment for ease of description, it is to be noted that the present invention should not be restricted only to such particular example. Either one or more of the functions may be physically merged with the other function to constitute an integral server. Moreover, a single server may be configured to have a single function spread into a plurality of loads.

(Features of the Present Invention)

Firstly, outlined features of the present invention will be described prior to describing the exemplary embodiment of the present invention. In the next generation IP telephone network (NGN/IMS), the present invention performs registration of a new user equipment UE in response to the current number of registered user equipment or the load condition of each call session control server (S-CSCF server) in the home network and determines the particular call session control server (S-CSCF server) that administrates call session control of the user equipment UE. In this way, the number of user equipment UE that is taken care of by each call session control server (S-CSCF server) is equalized, thereby avoiding confusion in a particular call session control server (S-CSCF server) due to concentration to such server.

(Construction of the Exemplary Embodiment)

Figure 1:
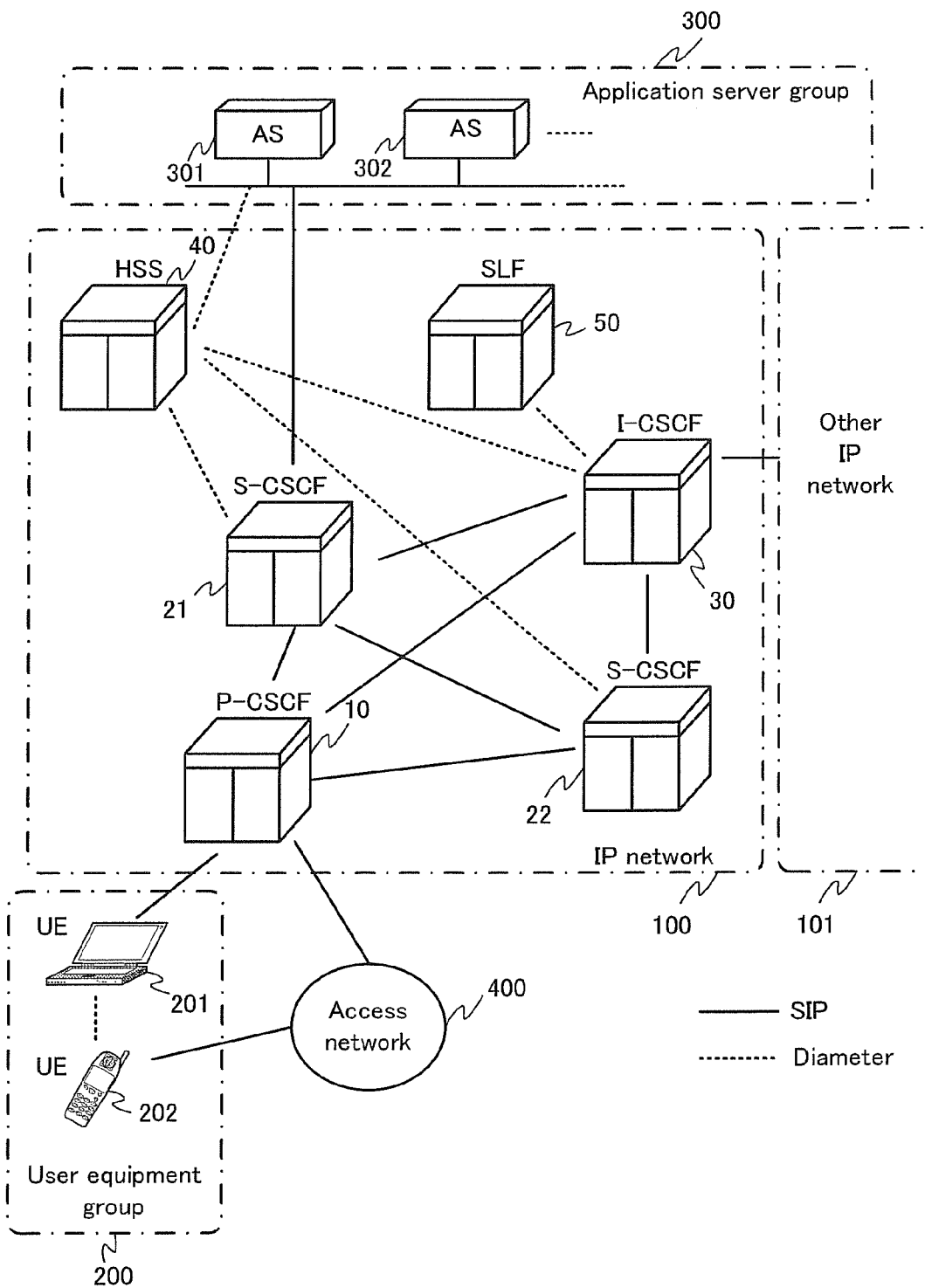
FIG. 1 is a diagram to show an exemplified system configuration of the IP network in the IMS architecture to which the present invention is applied.
Figure 7:
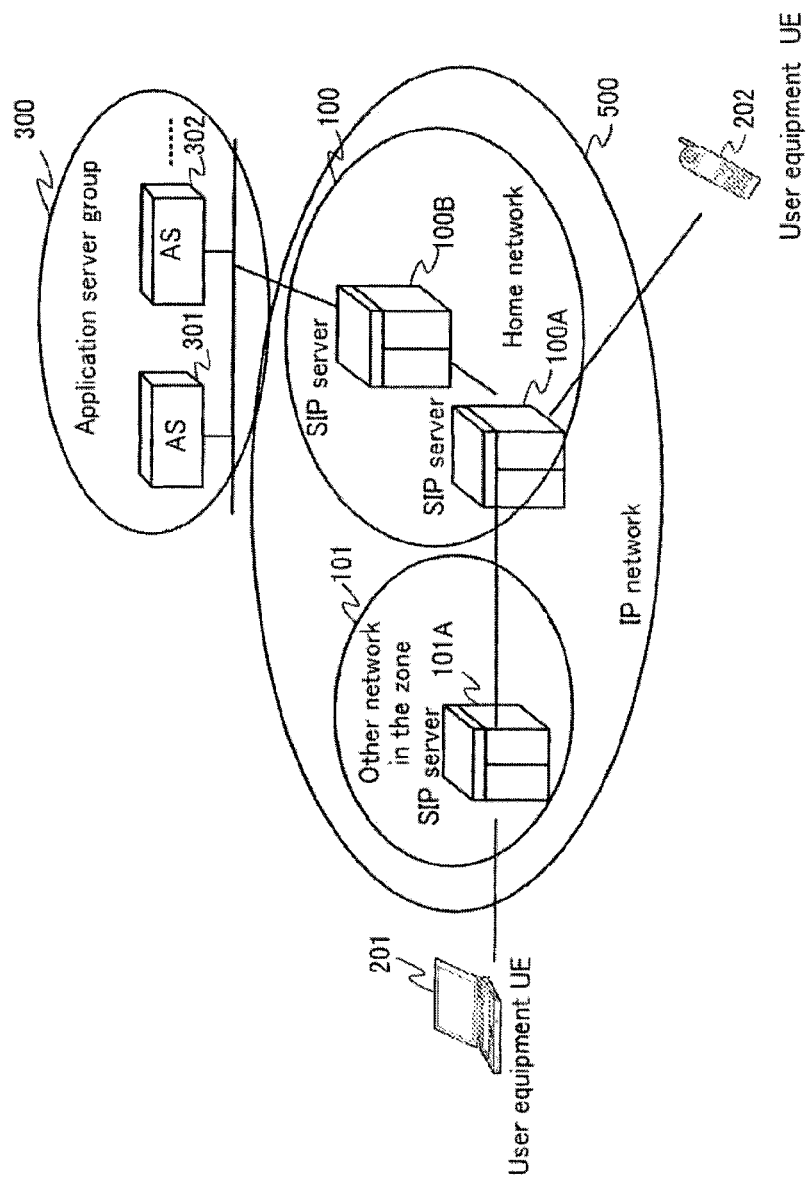
FIG. 7 is a conceptual example of basic constituent elements of the IMS network.
Figure 8:
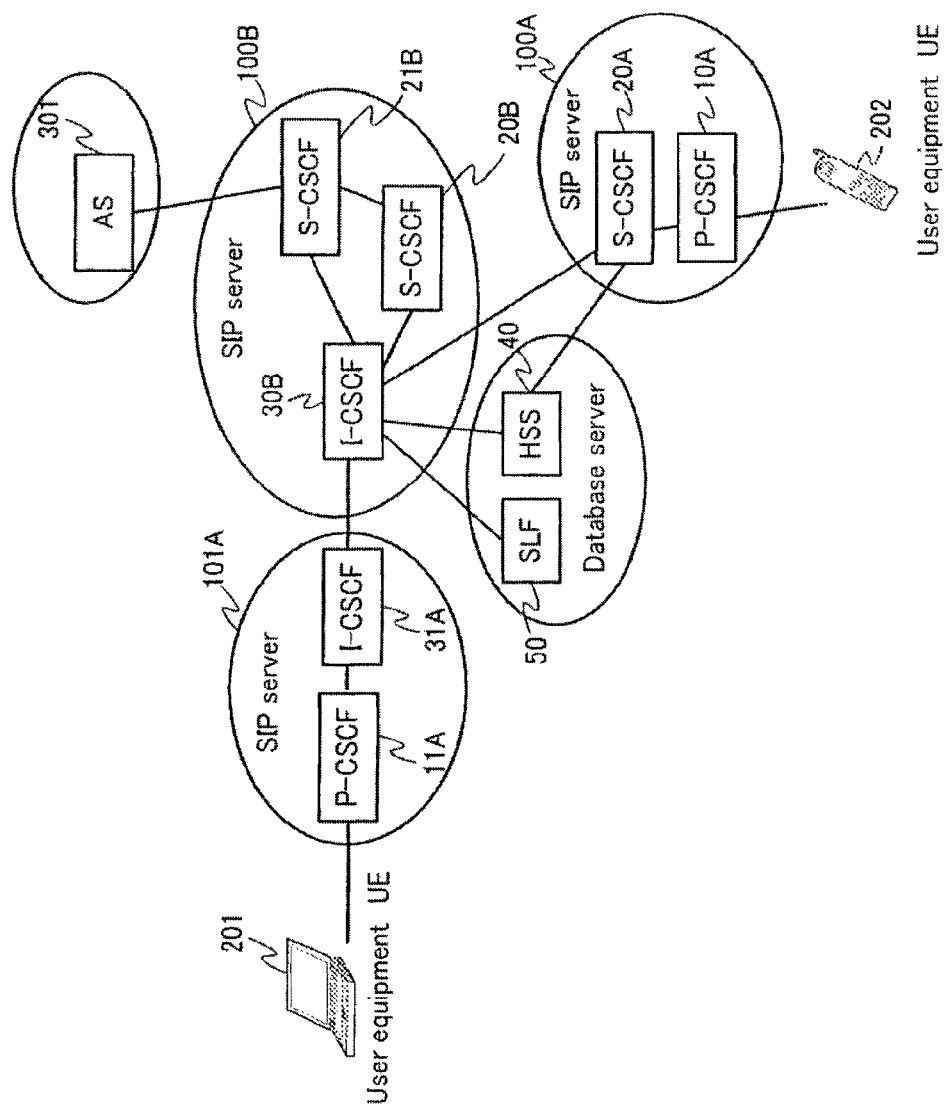
FIG. 8 is a conceptual diagram to show functions of the SIP server that is a core element of the IMS architecture IP network.
Figure 9:
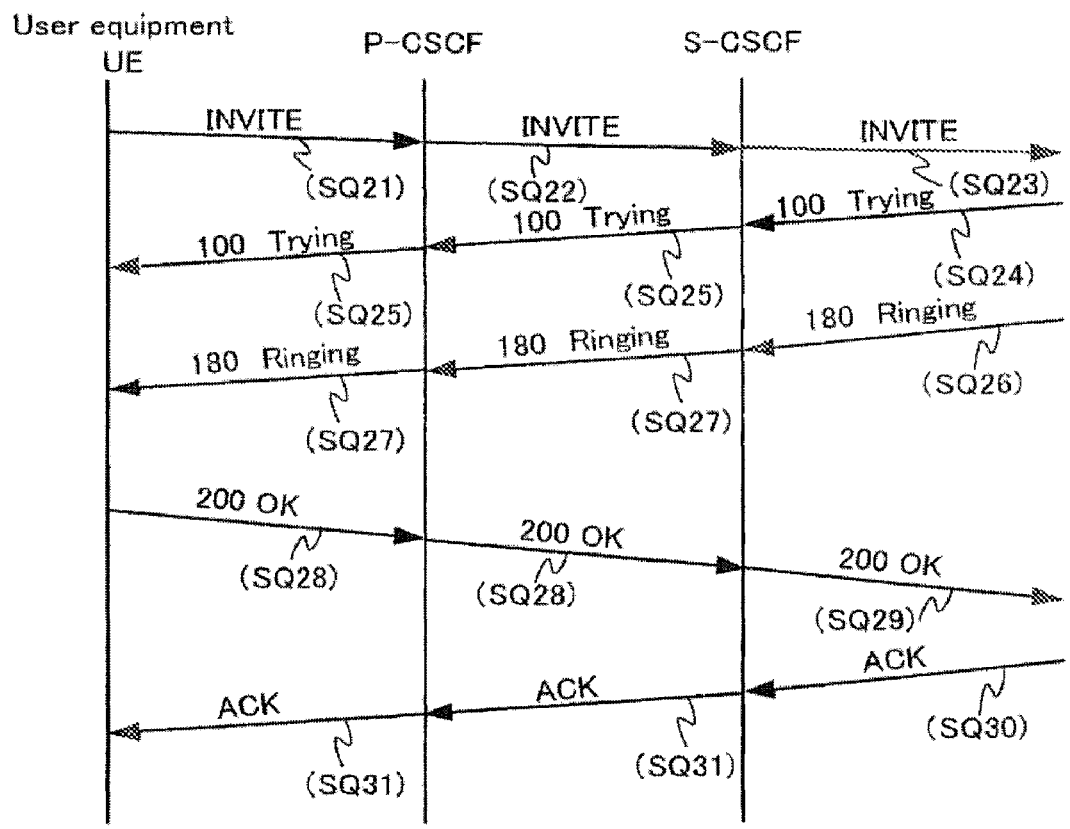
FIG. 9 is a sequence chart to show flows of transmission procedures when a user equipment performs IMS communications.
Figure 10:
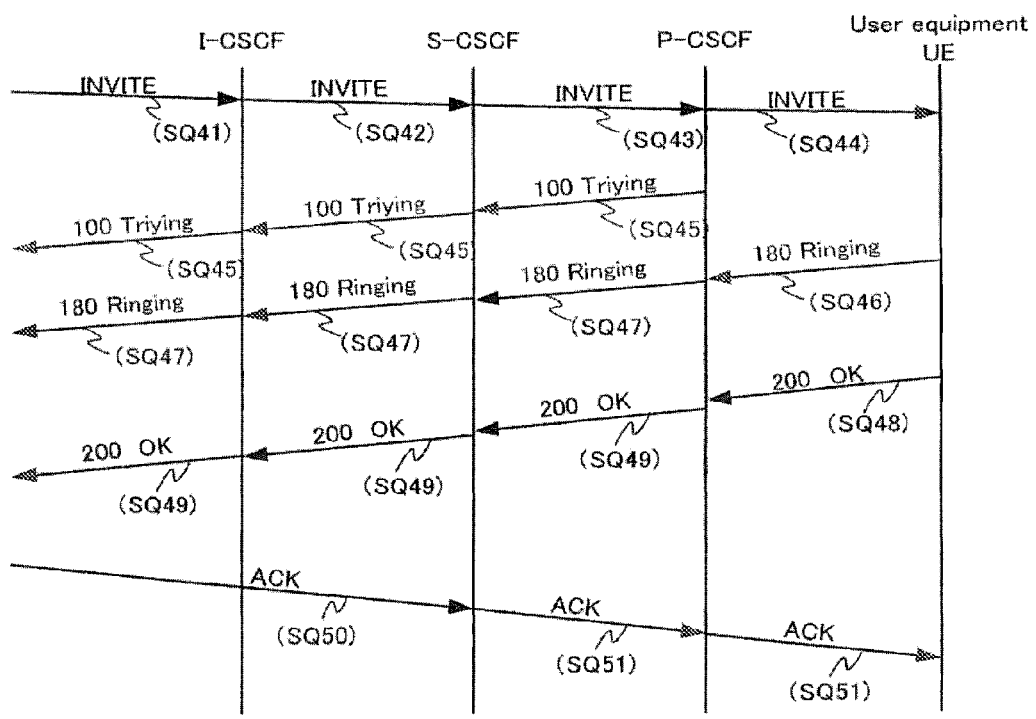
FIG. 10 is a sequence chart to show flows of receiving procedures when a user equipment performs IMS communications.
Figure 11:
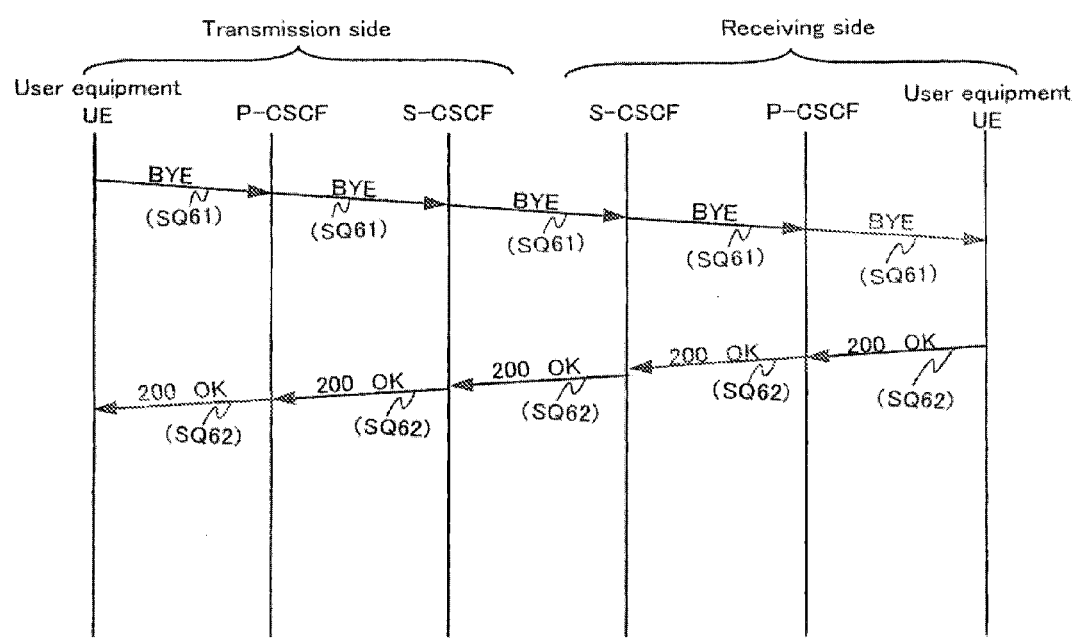
FIG. 11 is a sequence chart to show flows of procedures when a user equipment terminates IMS communications.

FIG. 1 is a diagram to show an exemplified IP network system in IMS architecture to which the present invention is applied. The system construction as shown in FIG. 1 is substantially similar to the construction as described hereinabove in the background of the invention with reference to FIGS. 7 and 8. That is, the IP network 100 that constitutes the home network comprises at least a SIP server group having each of the P-CSCF, I-CSCF and S-CSCF functions, and a database server group of HSS servers (Home Subscriber Servers) for registering user information (subscriber information) of each IMS user that performs IMS communications and an SLF server (Subscriber Locator Function) for registering the correspondence between the plurality of HSS servers and the users.

In the system configuration as shown in FIG. 1, the SIP server group in the IP network 100 comprises the P-CSCF server (user equipment accommodation session control server) 10 for making connection to user equipment UE 201, 202 and the like either directly or by way of an access network 400, S-CSCF servers (Call Session Control Servers) 21, 22 and the like that perform registration (location registration and user information registration) of the user equipment UE 201, 202 and the like for performing IMS communications and also administrate call session control of the user equipment 201, 202 and the like and an I-CSCF server (Interrogating Session Control server) 30 that accepts interrogations from other CSCF servers and also has a gateway function with another IP network 101.

Moreover, as the database server group of the IP network 100, there are provided an HSS server 40 in which user information (subscriber information) of each server is registered for performing IMS communications using the IP network 100 as the home network and an SLF server 50 in which information to distinguish the HSS server 40 having registered user information for each user is recorded.

As an application server group 300 to provide various application services, there are also provided application servers AS 301, 302 and the like that are connected to the S-CSCF server 21 and the like by way of a standard interface known as a SIP based ISC (IMS Service Control).

In the system configuration as shown in FIG. 1, solid lines interconnecting each SIP server (the P-CSCF server 10, the S-CSCF servers 21, 22 and the I-CSCF server 30), the HSS server 40, the SLF server 50, the application servers AS 301, 302 and the like and the user equipment UE 201, 202 and the like represent interfaces to communicate using the SIP protocol. On the other hand, dotted lines represent interfaces to communicate using the Diameter protocol. Even if the user equipment UE 201, 202 and the like that use the IP network 100 as the home network may move to another IP network 101, a roaming connection with another IP network 101 is established by way of the I-CSCF server 30, thereby enabling to enjoy exactly the same IMS communication services as in the case when they are located in the home network of the IP network 100.

Figure 2:
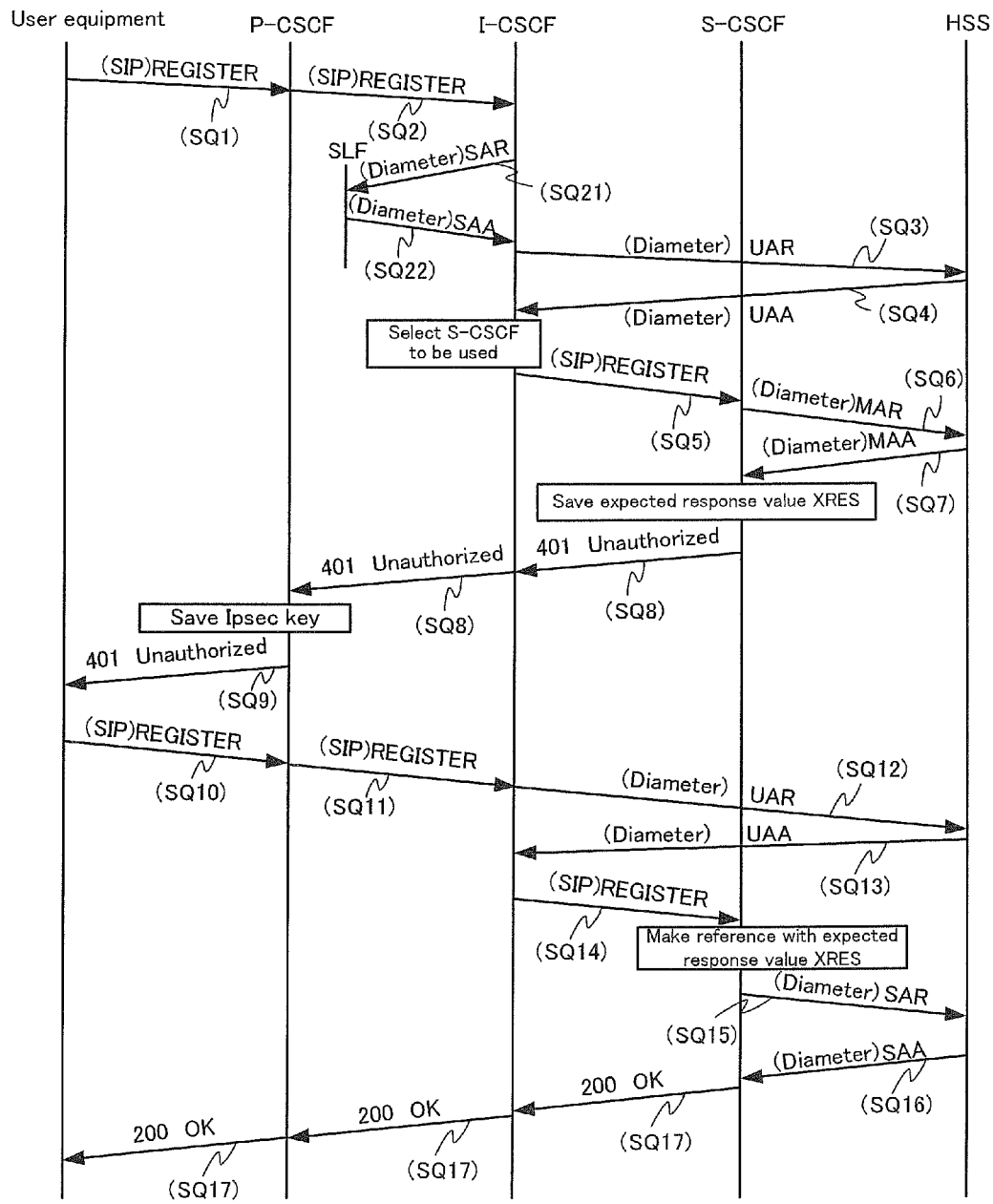
FIG. 2 is a sequence chart to show the registration procedures of a user equipment to an S-CSCF server prior to starting IMS communications.

Now, basic procedures for registering an IMS subscriber user to the S-CSCF server (Call Session Control server) for performing IMS communications will be described with reference to FIG. 2. FIG. 2 is a sequence chart to show flows of registration procedures that the user equipment UE is registered to the S-CSCF server prior to starting IMS communications. An example of registering the user equipment UE 201 to the S-CSCF server 21 will be described hereunder.

When starting IMS communications, the user equipment UE 201 is required to follow the registration procedures to the S-CSCF server 21 prior to transmission and receiving operations. This is because at least the current location of the user equipment UE must be registered to the S-CSCF server 21 that administrates call session control so that mobile terminals are unitary handled as the user equipment UE in IMS communications. Moreover, it is necessary to maintain communication security by establishing user authentication as well as IPsec (IP security protocol) at the registration time.

The registration of IMS communication is performed by mutual authentication between the user equipment UE 201 side and the IP network 100 side of the IMS network based upon the user information (private user ID (IMPI), the public user ID (IMPU) and the long term common key (Ki) of the IMS subscriber user. The user information that is used for authentication is registered and memorized in advance in both of the UICC (Universal Integrated Circuit Card) installed in the user equipment UE 201 and the HSS server 40 in the IP network 100. It is to be noted that the public user ID IMPU) is an identifier corresponding to a telephone number of the E.164 Recommendation for uniquely identify the user equipment UE 201.

In FIG. 2, in order to request registration for IMS communication, the user equipment UE 201 first sends to the P-CSCF server 10 a "SIP REGISTER message" including the private user ID (IMPI) and the URI (Uniform Resource Identifier) indicating its home domain (sequence SQ1). Then, the P-CSCF server 10 transfers the received "SIP REGISTER message" to the I-CSCF server 30 in the IP network 100 of the home IMS domain (sequence SQ2). The I-CSCF server 30 that received the "SIP REGISTER message" gains access to the HSS server 40 using the UAR (User Authorization Request) of the Diameter protocol (sequence SQ3) for receiving the S-CSCF server candidates to be used in communications of the user equipment UE 201 by the UAA (User Authorization Answer) of the Diameter protocol (sequence SQ4). The I-CSCF server 30 chooses the S-CSCF server 21 from the candidates to be used in communications of the user equipment 201 and transfers the "SIP REGISTER message" to the chosen S-CSCF server 21 (sequence SQ5).

It is to be noted herein that if there are a plurality of HSS servers in the IP network 100, HSS server selection procedures are carried out. That is, the I-CSCF server 30 gains access to the SLF server 50 using the SAR (Server Assignment Request) of the Diameter protocol in order to identify the particular HSS server 40 in which the user information of the user equipment UE 201 is registered (sequence SQ21) and receives from the SLF server 50 the information for identifying the HSS server 40 corresponding to the user equipment UE 201 using the SAA (Server Assignment Answer) of the Diameter protocol (sequence SQ22).

The S-CSCF server 21 that received the "SIP REGISTER message" informs the HSS server 40 the private user ID (IMPI) and the public user ID (IMPU) of the user equipment UE 201 as well as its S-CSCF name, etc. using the MAR (Multimedia Authentication Request) of the Diameter protocol in order to ask for calculation of authentication vectors (sequence SQ6). The HSS server 40 generates a random word RAND based upon the private user ID (IMPI), the public user ID (IMPU) and its S-CSCF name received from the S-CSCF server 21, generates the authentication vectors (the authentication token AUTN of the IP network 100, an expected response value XRES from the user equipment UE, a confidentiality key Ck to be used in IPsec and a matching check key Ik to be used in IPsec) using the generated random word RAND and the long term common key (Ki) and returns (sends back) the authentication vectors together with the random word RAND to the S-CSCF server 21 (sequence SQ7).

The S-CSCF server 21 saves only the expected response value XRES of the authentication vectors that received from the HSS server 40 for making reference with the authentication response that will be sent back later from the user equipment UE 201 and then the remaining authentication vectors and the random word RAND are returned to the P-CSCF server 10 by way of the I-CSCF server 30 as a "401 Unauthorized message" (sequence SQ8). Subsequently, the P-CSCF server 10 that received the "401 Unauthorized message" extracts and saves the confidentiality key Ck and the matching check key Ik as the common keys to use for IPsec communications and then returns to the use equipment UE 201 as the "401 Unauthorized message" including the authentication token AUTN of the IP network 100 and the random word RAND (sequence SQ9).

The user equipment UE 201 that received the "401 Unauthorized message" performs authentication for the authentication token AUTN of the IP network using the random word RAND and the long term common key (Ki), calculates the RES (authentication response), the confidentiality key Ck and the matching check key Ik, sets the IPsec communication condition using the confidentiality key Ck and the matching check key Ik and returns to the P-CSCF server 10 the "SIP REGISTER message" including the authentication response of the response value to the authentication request (sequence SQ10). Upon acquiring the confidentiality key Ck and the matching check key Ik, SIP communication messages between the user equipment UE 201 and the P-CSCF server 10 are protected by encryption as the IPsec communications.

The P-CSCF server 10 that received the "SIP REGISTER message" including the authentication response RES transfers the "SIP REGISTER message" to the S-CSCF server 21 byway of the I-CSCF server 30 (sequence SQ11). At the time of receiving the "SIP REGISTER message" including the authentication response RES, the I-CSCF server 30 interrogates the HSS server 40 in order to detect the S-CSCF server 21 that is selected for registration of the user equipment UE 201 (sequence SQ12 and SQ13) and transfers to the corresponding S-CSCF server 21 (sequence SQ 14). If there are a plurality of HSS servers 40, an interrogation is sent to the SLF server 50 for the particular HSS server 40 in which the user information (subscriber information) for the user equipment UE 201 is registered and stored, thereby identifying the HSS server 40 in charge.

The S-CSCF server that received the "SIP REGISTER message" including the authentication response RES makes reference between the authentication response RES of the user equipment UE 201 included in the "SIP REGISTER message" and the response expected value XRES that was saved therein. If it is successful in authenticating that the user equipment UE 201 is an authorized user, the HSS server 40 is notified that the communication registration of the user equipment UE 201 has been completed using the SAR (Server Assignment Request) of the Diameter protocol (sequence SQ15). Then, the user profiles (the public user ID (IMPU), an IFC (Initial Filter Criteria), the location information and the like) of the user equipment UE 201 are downloaded from the HSS server 40 using the SAA (Server Assignment Answer) of the Diameter protocol (sequence SQ16).

The S-CSCF server 21 that received the user profiles of the user equipment UE 201 from the HSS server 40 sends to the user equipment UE 201 a "200 OK" indicating that the registration for SIP communications of the user equipment UE 201 has been completed by way of the I-CSCF server 30 and the P-CSCF server 10 (sequence SQ17). The aforementioned procedures complete the registration procedures of the current location information and the user information (subscriber information) of the user equipment UE 201 to the S-CSCF server 21 through the procedures of determining the S-CSCF server 21 that administrates call session control for the user equipment UE 201 and the authentication procedures between the user equipment UE 201 and the IP network 100, thereby setting the user equipment UE 201 to the state that enables to start transmission and receiving operations.

Incidentally, conventional call session control server assignment procedures to determine the particular S-CSCF server 21 for administrating the call session control for the user equipment UE 201 by the I-CSCF server 30 through the procedures in the sequence SQ3 and SQ4 among the registration procedures of the user equipment UE 201 to the S-CSCF server 21 as described hereinabove with reference to FIG. 2 are performed by causing the HSS server 40 to transfer a list of all S-CSCF servers 21, 22 and the like in the home network and sequentially assigning the S-CSCF server for administrating call session control for the user equipment UE 201 in a predetermined order.

However, it is normal that the registration status of user equipment UE dynamically changes (i.e., increases or decreases) for each S-CSCF server 21, 22 and the like depending upon not only registration requests of new user equipment UE but also erases of registration and the like. This means that the conventional method of assigning S-CSCF servers in a predetermined constant sequence encounters uneven distribution of the number of registered user equipment UE among a plurality of S-CSCF servers, thereby unavoidably developing concentrated loads to a certain S-CSCF server.

Figure 3:
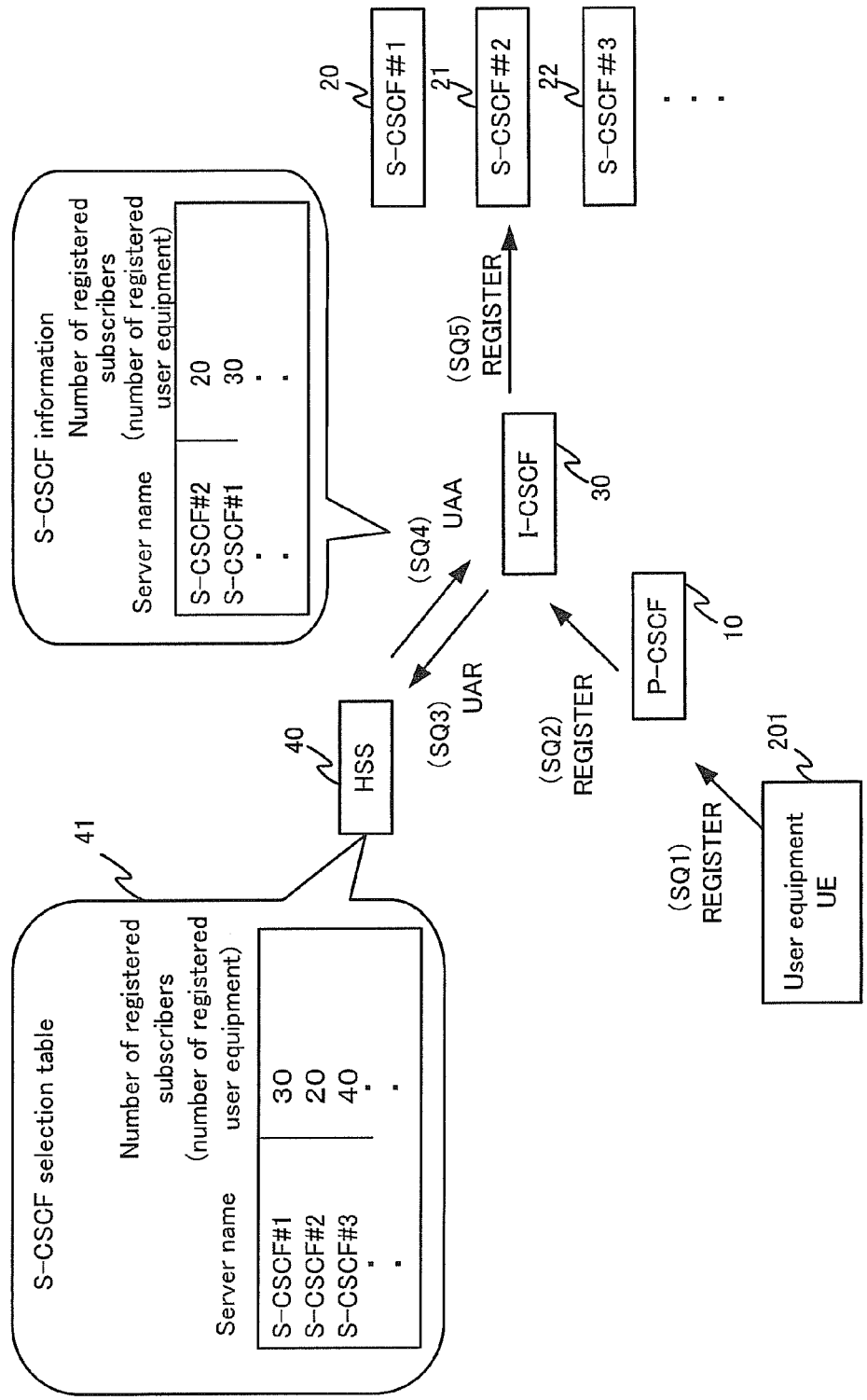
FIG. 3 is a conceptual diagram to show an exemplified assignment method of call session control servers S-CSCF servers) according to the present invention.

In the exemplified embodiment of the present invention, at the time of determining the particular S-CSCF server that registers the user equipment UE 201, an improvement is made so that the I-CSCF server 30 determines the S-CSCF server in response to the number of registered subscribers, i.e., the number of registered user equipment UE that are currently registered to respective S-CSCF servers 20, 21, 22 and the like in the IP network 100 of the home network as shown in FIG. 3. FIG. 3 is a conceptual diagram to describe an example of the call session control server (S-CSCF server) assignment method according to the present invention.

As shown in FIG. 3, at the time when the I-CSCF server 30 received from the HSS server 40 the candidates, in a form of list, of the S-CSCF servers 20, 21, 22 and the like to be used in communications of the user equipment UE by the UAA (User Authorization Answer9 of the Diameter protocol in the sequence SQ4 that has been described hereinabove with reference to FIG. 2, the UAA is constructed to receive in a form of including the currently registered subscribers (the number of registered user equipment UE) for each S-CSCF server 20, 21, 22 and the like as the S-CSCF information.

In other words, the HSS server 40 that receives interrogations from the I-CSCF server 30 is provided with an S-CSCF selection table 41 for selecting a particular S-CSCF server.

The S-CSCF selection table 41 has the registered and memorized number of currently registered subscribers (i.e., the number of registered user equipment UE) for each S-CSCF server 20, 21, 22 and the like that is able to assigned as the registration S-CSCF server. When an interrogation is received from the I-CSCF server 30, the HSS server refers to the S-CSCF selection table 41 and returns to the I-CSCF server 30 the S-CSCF information as the UAA after editing in a form that includes the number of currently registered subscribers (the number of registered user equipment UE) for each S-CSCF server 20, 21, 22 and the like.

The I-CSCF server 30 that received the S-CSCF list information including the number of currently registered subscribers (the number of registered user equipment UE) from the HSS server 40 assigns one of the S-SCSCF servers having the minimum number of currently registered subscribers (the number of user equipment UE) from the S-CSCF servers 20, 21, 22 and like (the S-CSCF server 21 indicated as the S-CSCF #2 in the particular example as shown in FIG. 3) as the particular S-CSCF server that administrates call session control for the user equipment UE 201 that sends the REGISTER message thereto. Subsequently, the I-CSCF server 30 informs the HSS server 40 the information for the newly assigned S-CSCF server and also sends the received REGISTER message to the S-CSCF server for causing the registration of the user equipment UE 201 to the assigned S-CSCF server (the S-CSCF server 21 in the particular example in FIG. 3).

In performing the S-CSCF server selection procedures by the I-CSCF server 30 in cooperation with the HSS server 40 in the above manner, it is possible to equalize the number of registered subscribers (the number of user equipment UE) in each S-CSCF server 20, 21, 22 and the like, thereby effectively achieving smooth load distributions.

Although it is described hereinabove with reference to FIG. 3 that the I-CSCF server 30 receives the S-CSCF list information including the number of currently registered subscribers (the number of registered user equipment UE) from the HSS server 40 and the particular S-CSCF server for registering the user equipment UE 201 is assigned with reference to the number of currently registered subscribers (the number of registered user equipment UE), it is possible that the HSS server 40 that received the interrogation from the I-CSCF server 30 by the UAR selects the S-CSCF server for performing the registration and only the information for the S-CSCF server as a result of such selection is sent back to the I-CSCF server 30.

In other words, the HSS server 40 that received the interrogation by the UAR refers to the S-CSCF selection table 41 and selects one S-CSCF server having the minimum number of currently registered subscribers (the number of user equipment UE) as the S-CSCF server to perform registration of the user equipment UE 201 from which the REGUSTER message is sent and then the UAA having such information set therein is sent back to the I-CSCF server 30. In such case, the I-CSCF server 30 that received the S-CSCF server selection result from the HSS server 40 recognizes the S-CSCF server appointed by the selection result as the S-CSCF server that succeeds the registration and sends the REGISTER message to such S-CSCF server, thereby decreasing the loads for procedures at the I-CSCF server 30 side.

Figure 4:
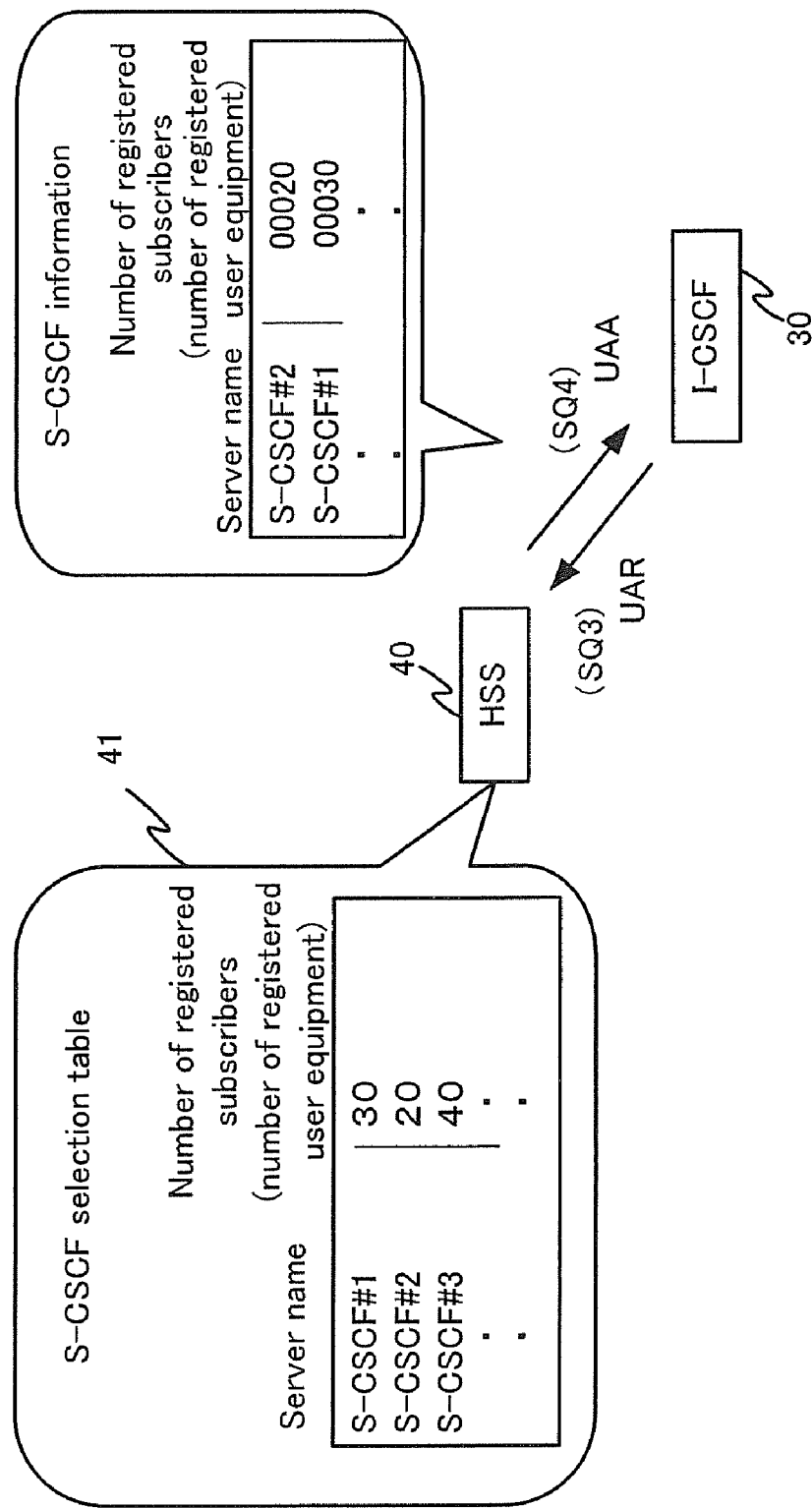
FIG. 4 is a diagram for describing a specific example to return from an HSS server an S-CSCF list including the current number of registered subscribers (the number of the registered user equipment UE) to an I-CSCF server.

Subsequently, with reference to FIG. 4, a description will be made on a format of returning the S-CSCF list information including the number of currently registered subscribers (the number of registered user equipment UE) as described hereinabove when returning a result of an interrogation as the UAA from the HSS server 40 that received an interrogation by the UAR to the I-CSCF server 30. FIG. 4 is a specific example of a format of returning the S-CSCF list information including the number of currently registered subscribers (the number of registered user equipment) from the HSS server 40.

As shown in FIG. 4, if the HSS server 40 returns to the I-CSCF server 30 the number of currently registered subscribers (the number of registered user equipment UE) for each S-CSCF server 20, 21, 22 and the like in a format including them using a capability information column that is included in the UAA of the Diameter protocol, it is possible to return the number of the currently registered subscribers following the currently specified Diameter protocol. The I-CSCF server 30 side that received the UAA refers to the Capability information, thereby enabling to select one of the S-CSCF servers with the minimum number of currently registered subscribers (the number of registered user equipment UE) from the S-CSCF servers 20, 21, 22 and the like.

Moreover, as shown in FIG. 4, when returning the list information of the S-CSCF servers 20, 21, 22 and the like by the UAA, the HSS server 40 is able to rearrange them in the order of sequentially increasing number of currently registered subscribers (the number of registered user equipment UE) before returning by the UAA. At the I-CSCF server 30 side that received the UAA after such rearrangement, it is possible to sequentially select the S-CSCF servers from the higher order, thereby reducing the loads of selection procedures at the I-CSCF server 30 side.

Figure 5:
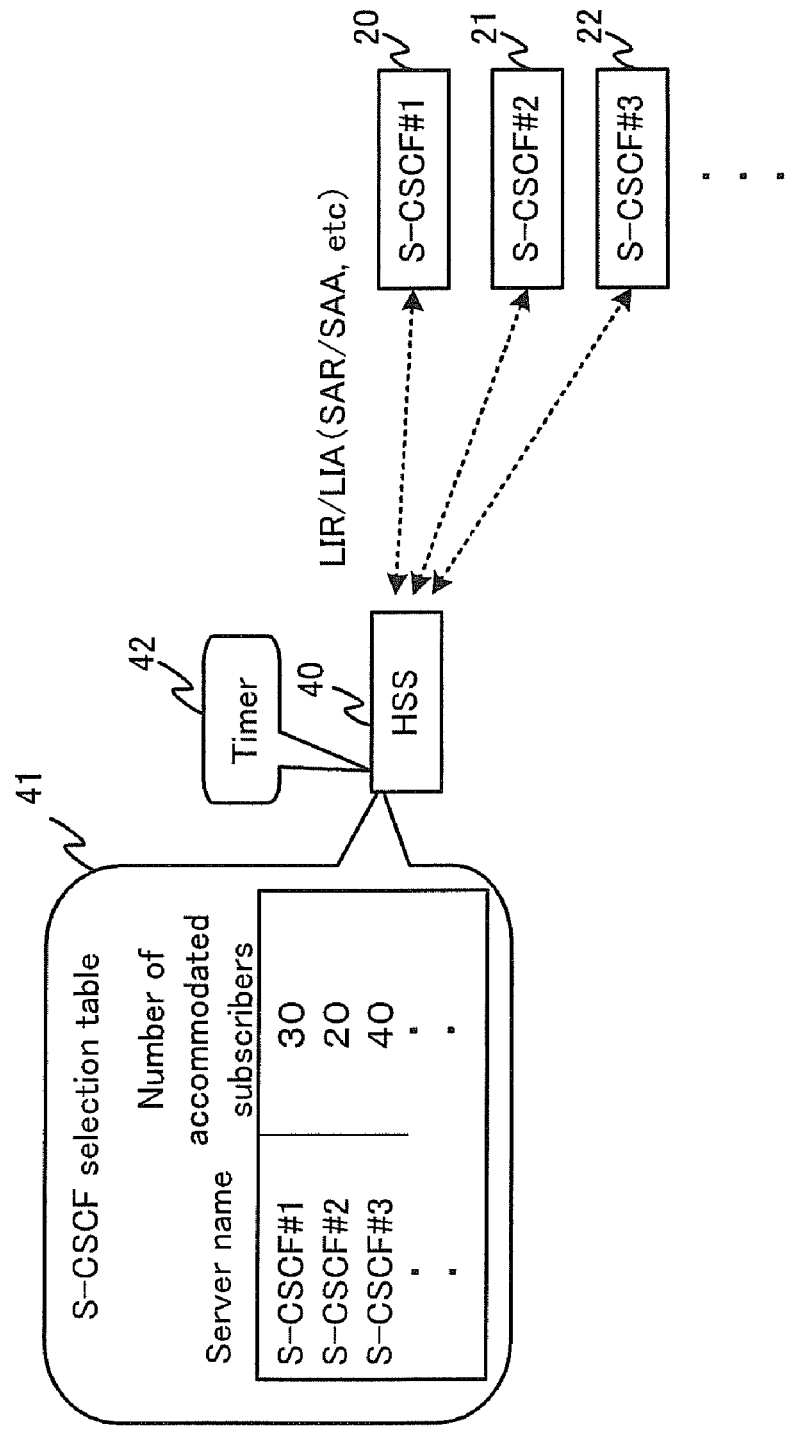
FIG. 5 is a diagram for describing an example of how the number of currently registered subscribers (the number of registered use equipment UE) in each S-CSCF server is transmitted to the HSS server.

In order to performing the S-CSCF selection procedures as shown in FIGS. 3 and 4, the HSS server 40 is provided with the S-CSCF selection table 41 for setting and registering the number of currently registered subscribers (the number of registered user equipment UE) for the respective S-CSCF servers 20, 21, 22 and the like. Such S-CSCF selection table 41 is required to be maintained in updated conditions. FIG. 5 is an example of describing how the number of currently registered subscribers (the number of registered user equipment UE) for the respective S-CSCF servers 20, 21, 22 and the like is sent to the HSS server 40. The HSS server 40 side is provided with a timer for timing a predetermined constant time interval so that the number of currently registered subscribers (the number of registered user equipment UE) for the respective S-CSCF servers 20, 21, 22 and the like is periodically received at every timeout of the constant time for registration by overwriting the S-CSCF selection table 41.

As shown in FIG. 5, the HSS server 40 interrogates the respective S-CSCF servers 20, 21, 22 and the like for the number of currently registered subscribers (the number of registered user equipment UE) at every timeout of the predetermined time of the timer 42 using the LIR (Location Information Request), the SAR (Server Assignment Request) or the like of the Diameter protocol. A control is made so that the number of currently registered subscribers (the number of registered user equipment UE) that received from the interrogated respective S-CSCF servers 20, 21, 22 and the like is sent back to the HSS server 40 using the LIA (Location Information Answer), the SAA (Server Assignment Answer9 or the like of the Diameter protocol. Based upon the number of the currently registered subscribers (the number of registered user equipment UE) that received from the respective S-CSCF servers 20, 21, 22 and the like, the S-CSCF selection table 41 can be periodically updated by overwriting the registration information.

Alternatively, opposite to the example in FIG. 5, it is possible that each of the S-CSCF servers 20, 21, 22 and the like is constructed to monitor if the predetermined time is lapsed and sends the number of currently registered subscribers (the number of registered user equipment UE) for each S-CSCF server to the HSS server 40 at every timeout using the LIR or the SAR.

Different from the above examples, it is also possible that the HSS server 40 updates the registration information in the S-CSCF selection table 41 in order to maintain it to the updated state whenever the S-CSCF server for registering the user equipment UE for performing IMS communications, whenever the S-CSCF server is determined and such information is sent to the HSS server 40 from the determined S-CSCF server, or whenever the registration to the S-CSCF server is erased and such information is sent to the HSS server 40. Even in these cases, it is possible that the respective S-CSCF servers 20, 21, 22 and the like are made to periodically send the number of currently registered subscribers (the number of registered user equipment UE) for synchronizing the registration information in the respective S-CSCF servers.

Other Embodiments

Figure 6:
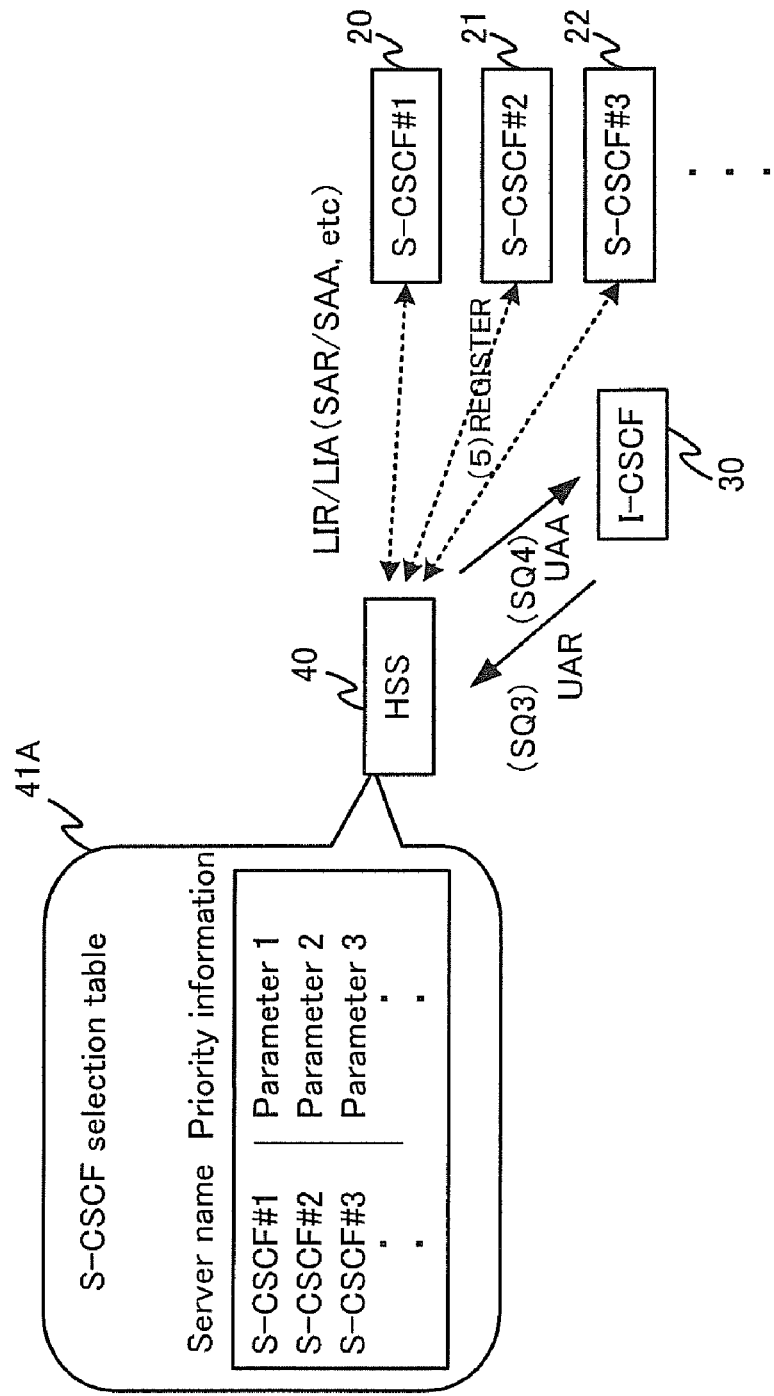
FIG. 6 is a conceptual diagram for describing an example of the assignment method of call session control servers (S-CSCF servers) according to the present invention different from FIG. 3.

FIG. 6 is a conceptual diagram of an example different from FIG. 3 of the call session control server (S-CSCF server) assignment method according to the present invention. Contents of registration in an S-CSCF selection table 41A for selecting S-CSCF servers provided in the HSS server 40 differ from those in the S-CSCF selection table 41 in FIG. 3. In other words, the S-CSCF selection table 41A as shown in FIG. 6 utilizes information representing the current operating condition of the respective S-CSCF servers 20, 21, 22 and the like as priority information that indicates the order of priority in selecting the S-CSCF servers. Such priority information is registered as parameter 1, parameter 2 and the like in place of the number of registered subscribers (the number of registered user equipment UE) in the S-CSCF selection table 41 in FIG. 3.

It is to be noted herein that the priority information for S-CSC server selection to be registered in the S-CSCF selection table 41A may be, for example, the information on call sessions such as the current amount of calls per unit time, the number of simultaneous connections or the number of transmitted or received messages of the respective S-CSCF servers 20, 21, 22 and the like to be used in replace of the number of registered subscribers (the number of registered user equipment UE). Alternatively, it is possible to use the information on the total loads such as the current rate of use of the processing processor (CPU) per unit time, the rate of use of memories, the number of total transmitted or received messages including maintenance messages per unit time, the total size of transmitted and received messages or the like of the respective S-CSCF servers 20, 21, 22 and the like. The use of such information on the total loads as the priority information for selecting the S-CSCF servers enables to set the order of priority for assigning the user equipment to an appropriate low order, for example, when the current condition of a certain S-CSCF server has a low load of call sessions but is in a considerably high total load condition due to maintenance procedures such as backup procedures and recovery procedures from confusions and troubles.

In case of using the S-CSCF selection table 41A as shown in FIG. 6, at the time when an interrogation by the UAR is received from the I-CSCF server 30, the HSS server 40 selects the particular S-CSCF server for registration of the user equipment UE based upon the priority information as registered in the S-CSCF selection table 41A. Such selection is returned to the I-CSCF server 30 or alternatively the UAR including the current parameter (the priority information) of the respective S-CSCF servers 20, 21, 22 and the like is to the I-CSCF server 30, thereby enabling the I-CSCF server 30 to assign the particular S-CSCF server for registration based upon the priority information.

Moreover, in accordance with periodic transmission instructions by the LIN, the SAR or the like from the HSS server 40, the current parameters (priority information) from the respective S-CSCF server 20, 21, 22 and the like are sent back or information on the current parameters (priority information) are periodically sent back from the respective S-CSCF servers 20, 21, 22 and the like are sent back to the HSS server 40, thereby enabling to periodically update the registration contents of the S-CSCF selection table 41A. Alternatively, whenever events such as registration or erasing of the user equipment occur, the registration contents of the S-CSCF selection table 41A are continuously updated.

The exemplary embodiments of the present invention have been described hereinabove. However, it is to be noted that such embodiments are nothing but examples of the present invention and that the present invention should not be restricted to such embodiments. It is understood that a person having an ordinary skill in the art is able to make various modifications or alternations to best fit to particular applications without departing from the scope and sprit of the present invention.

What is claimed is:

1. A call session control server assignment method for assigning a particular call session control server (S-CSCF server) that registers a user equipment and administrates call session control on the user equipment from a plurality of S-CSCF servers in an IP network for achieving IMS (IP Multimedia Subsystem) architecture, the method comprising:

providing a S-CSCF server selection table that stores in correspondence with each S-CSCF server priority information indicating an order of priority when assigning user equipment in accordance with a current operation condition of each S-CSCF server in a home subscriber server (HSS server) that stores user information for each user equipment;

referring to the S-CSCF server selection table by the HSS server when it receives an interrogation from an interrogating session control server (I-CSCF server) for determining the particular S-CSCF server that registers the user equipment at a time of registration thereof;

sending back, by the HSS server, information including the priority information of the plurality of S-CSCF servers registered in the S-CSCF server selection table to the I-CSCF server from which the interrogation is sent;

determining, by the I-CSCF server, the particular S-CSCF server to be assigned based upon the sent back priority information of each S-CSCF server, wherein at the time of sending back the information including the priority information of the plurality of S-CSCF servers to the I-CSCF server from which the interrogation is sent, the HSS server rearranges the plurality of S-CSCF servers in the sequence corresponding to the priority information before sending back to the I-CSCF server from which the interrogation is sent.

2. A call session control server assignment method of claim 1, wherein in case of using a Diameter protocol in information exchange between the HSS server and the I-CSCF server, the HSS server uses a Capability information column that is included in a UAA (User Authorization Answer) of the Diameter protocol for sending back the information including the priority information for the plurality of S-CSCF servers to the I-CSCF server from which the interrogation is sent.

3. A call session control server assignment method of claim 1, wherein the HSS server sends a request for returning information corresponding to the priority information to the plurality of call session control servers at every predetermined time interval, thereby periodically updating the priority information in the S-CSCF server selection table based upon the information sent back thereto from the plurality of S-CSCF servers.

4. A call session control server assignment method of claim 1, wherein the HSS server receives the information corresponding to the priority information sent thereto from the plurality of S-CSCF servers at every predetermined interval for periodically updating the priority information in the S-CSCF server selection table based upon the information received from the plurality of S-CSCF servers.

5. A call session control server assignment method of claim 1, wherein the priority information stored in the S-CSCF server selection table of the HSS server is the number of currently registered user equipment in the respective S-CSCF servers.

6. A call session control server assignment method of claim 1, wherein the priority information stored in the S-CSCF server selection table of the HSS server is a current amount of calls per unit time and/or a number of simultaneous connections and/or a number of transmitted or received messages of respective S-CSCF servers.

7. A call session control server assignment method of claim 1, wherein the priority information stored in the S-CSCF server selection table of the HSS server is the current operation rate of a processing processor per unit time and/or a rate of use of memories and/or a size of transmitted and received messages of respective S-CSCF servers.

8. A call session control server assignment system for assigning a particular call session control server (S-CSCF server) that registers a user equipment and administrate call session control on the user equipment from a plurality of S-CSCF servers in an IP network for achieving an IMS (IP Multimedia Subsystem) architecture, the system comprising:
a home subscriber server (HSS server) that stores user information for each user equipment and includes a S-CSCF server selection table that stores in correspondence with each S-CSCF server priority information indicating an order of priority when assigning user equipment in accordance with a current operation condition of each S-CSCF server; and
an interrogating session control server (I-CSCF server) that determines the particular S-CSCF server to register the user equipment at a time of registration of the user equipment,
wherein:
the HSS server refers to the S-CSCF server selection table when an interrogation is received from the I-CSCF server, and the HSS server sends back information including the priority information of the plurality of S-CSCF servers registered in the S-CSCF server selection table to the I-CSCF server,
the I-CSCF server determines the particular S-CSCF server to be assigned based upon the sent back priority information of each S-CSCF server, and
at the time of sending back the information including the priority information of the plurality of S-CSCF servers to the I-CSCF server, the HSS server rearranges the plurality of S-CSCF servers in the sequence of the priority information and sends back to the I-CSCF.

* * * * *